United States Patent [19]

Eichenauer et al.

[11] Patent Number: 4,622,363

[45] Date of Patent: Nov. 11, 1986

[54] THERMOPLASTIC MOULDING COMPOSITIONS WITH AN IMPROVED HEAT DISTORTION POINT

[75] Inventors: Herbert Eichenauer, Dormagen; Hans-Jürgen Kress, Krefeld; Karl-Heinz Ott; Horst Peters, both of Leverkusen; Josef Buekers, Krefeld, all of Fed. Rep. of Germany

[73] Assignee: Bayer Aktiengesellschaft, Leverkusen, Fed. Rep. of Germany

[21] Appl. No.: 778,882

[22] Filed: Sep. 23, 1985

[30] Foreign Application Priority Data

Oct. 5, 1984 [DE] Fed. Rep. of Germany ....... 3436454

[51] Int. Cl.$^4$ ............................................. C08L 69/00
[52] U.S. Cl. ...................................... 525/67; 525/148
[58] Field of Search ................... 525/67, 148, 468, 80

[56] References Cited

U.S. PATENT DOCUMENTS

| Re. 31,165 | 3/1983 | Serini et al. | 525/67 |
| 3,852,394 | 12/1974 | Kubota et al. | 525/67 X |
| 4,204,047 | 5/1980 | Margotte et al. | 525/67 |
| 4,218,544 | 8/1980 | Henton | 525/67 |

FOREIGN PATENT DOCUMENTS

0062838 3/1982 European Pat. Off. .
1558835 12/1976 United Kingdom .

*Primary Examiner*—Theodore E. Pertilla
*Attorney, Agent, or Firm*—Connolly and Hutz

[57] ABSTRACT

The present invention relates to the use of a copolymer with an $\overline{M}w$ of $2 \times 10^6$ to $1 \times 10^7$ in amounts of 0.5 to 5 parts by weight for improving the heat distortion point of thermoplastic mixtures containing polycarbonates, graft polymers and copolymers, and the thermoplastic mixtures correspondingly rendered dimensionally stable under the influence of heat.

2 Claims, No Drawings

THERMOPLASTIC MOULDING COMPOSITIONS WITH AN IMPROVED HEAT DISTORTION POINT

The present invention relates to the use of a copolymer of (a) 95 to 50% by weight of a vinylaromatic and (b) 5 to 50% by weight of an ethylenically unsaturated nitrile compound and/or an ester of (meth)acrylic acid, which has a molecular weight $\overline{M}w$ (weight-average) of $2 \times 10^6$ to $1 \times 10^7$, preferably $2 \times 10^6$ to $5 \times 10^6$, in amounts of 0.5 to 5 parts by weight, in each case based on 100 parts by weight of the mixture of polycarbonates, graft polymers and copolymers, for improving the heat distortion point of thermoplastic mixtures containing polycarbonates, graft polymers and copolymers.

The invention furthermore relates to thermoplastic mixtures containing thermoplastic polycarbonates (A), graft polymers (B) and two types of copolymers (C) and (D), preferably (A) 20–75 parts by weight of a thermoplastic polycarbonate, (B) 10–50 parts by weight of a graft polymer of (B)(1) 5 to 90 parts by weight, preferably 30 to 80 parts by weight, of a mixture of (B)(1)(1) 50 to 90% by weight of styrene, α-methylstyrene, nuclear-substituted styrene, methyl methacrylate or mixtures thereof and (B)(1)(2) 50 to 5% by weight of (meth)acrylonitrile, methyl methacrylate, maleic anhydride, N-substituted maleimide or mixtures thereof, on (B)(2), 95 to 10 parts by weight, preferably 70 to 20 parts by weight, of a rubber with a glass transition temperature $TG \leq 10°$ C., and (C) 10 to 70 parts by weight of a thermoplastic copolymer with an $\overline{M}w$ of 15,000 to 200,000 (measured by light scattering or sedimentation) of (C)(1) 50 to 95% by weignt of styrene, α-methylstyrene, nuclear-substituted styrene, methyl methacrylate or mixtures thereof and (C)(2) 50 to 5% by weight of (meth)acrylonitrile, methyl methacrylate, maleic anhydride, N-substituted maleimide or mixtures thereof, which are characterised in that they contain a copolymer (D) of (a) 95 to 50% by weight of a vinylaromatic and (b) 5 to 50% by weight of an ethylenically unsaturated nitrile compound and/or of an ester of (meth)acrylic acid, with an $\overline{M}w$ (weight-average molecular weight) of $2 \times 10^6$ to $1 \times 10^7$, preferably $2 \times 10^6$ to $5 \times 10^6$, in amounts of 0.5 to 5 parts by weight, in each case based on 100 parts by weight of the mixture of polycarbonates (A), graft polymers (B) and the two copolymers (C) and (D).

The mixtures according to the invention of polycarbonates, graft polymers and copolymers can also contain the usual amounts of the additives customary in polycarbonate, graft polymer or copolymer chemistry, such as flameproofing agents, stabilisers, pigments, flow control agents, mould release agents and/or antistatics.

DE-OS (German Published Specification) No. 1,964,915 describes the use of corresponding copolymers in thermoplastic styrene polymers, thermoplastic styrene polymers also including styrene/acrylonitrile copolymers or graft polymers of acrylonitrile and styrene on polybutadiene elastomers (page 7 of DE-OS). Such mixtures, which must be compatible, have an improved processability, especially in respect of stretching or elongation during thermal deformation of films, and a better foaming ability in the various foaming processes. According to British Patent Specification No. 1,558,835, such copolymers can be used as polymeric modifiers for improving the mechanical properties of other polymers (page 3, lines 114/115).

According to Japanese Patent Application No. 57 117 505 of Sumitomo Chem. KK of 12.1.1981, such high molecular weight polymers are also suitable as mixture constituents for improving the mechanical properties.

To our knowledge, no indication of improved heat distortion point of the admixtures according to the invention is to be found in these literature references.

Thermoplastic aromatic polycarbonates of component (A) which are suitable according to the invention are homopolycarbonates and copolycarbonates of one or more of the following diphenols, chosen from hydroquinone, resorcinol, dihydroxydiphenyls, bis-(hydroxyphenyl)-alkanes and -cycloalkanes, bis-(hydroxyphenyl) sulphides, ethers, ketones, sulphoxides and sulphones and α,α'-bis-(hydroxyphenyl)-diisopropylbenzenes.

Thermoplastic aromatic polycarbonates of component (A) which are preferred according to the invention are those based on diphenols of the formula (I)

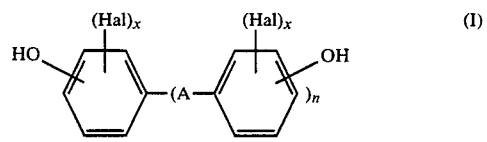

wherein
A is a single bond, $C_1$–$C_5$-alkylene, $C_2$–$C_5$-alkylidene, $C_5$–$C_6$-cycloalkylidene, —S— or —$SO_2$—, Hal, chlorine or bromine,
x is 0, 1 or 2 and
"n" is 1 or zero.

Diphenols of the formula (I) are either known from the literature or can be prepared by processes which are known from the literature.

The preparation of the polycarbonates of component (A) which are suitable according to the invention is known from the literature and can be carried out, for example, with phosgene by the phase boundary process or with phosgene by the process in a homogeneous phase system (the so-called pyridine process), the particular molecular weight to be established being achieved in a known manner by a corresponding amount of known chain stoppers.

The polycarbonates of component (A) which are suitable according to the invention have mean weight-average molecular weights ($\overline{M}w$, measured, for example, by ultracentrifugation or scattered light measurement) of 10,000 to 200,000, preferably 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Particularly preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

The polycarbonates of component (A) which are suitable according to the invention can be branched in a known manner, and in particular preferably by incorporation of 0.05 to 2.0 mol %, based on the sum of the diphenols employed, of compounds which are trifunctional or more than trifunctional, for example those with three or more tnan three phenolic OH groups.

Rubbers which are suitable for the preparation of the graft polymers of component (B) are, in particular, polybutadiene and butadiene/styrene copolymers with up to 30% by weight, based on the weight of rubber, of a lower alkyl ester of acrylic or methacrylic acid (for example methyl methacrylate, ethyl acrylate, methyl acrylate or ethyl methacrylate). Examples of other suitable rubbers are polyisoprene or polychloroprene. Alkyl acrylate rubbers based on $C_1$-$C_8$-alkyl acrylates, in particular ethyl, butyl and ethylhexyl acrylate, are furthermore suitable. These alkyl acrylate rubbers can optionally contain up to 30% by weight, based on the weight of rubber, of copolymerised monomers, such as vinyl acetate, acrylonitrile, styrene, methyl methacrylate and/or vinyl ether. These alkyl acrylate rubbers can furthermore contain relatively small amounts, preferably up to 5% by weight, based on the weignt of rubber, of ethylenically unsaturated monomers with a crosslinking action. Examples of such crosslinking agents are alkylene diol di(meth)-acrylates, polyester di-(meth)-acrylates, divinylbenzene, tri-vinylbenzene, triallyl cyanurate, allyl (meth)-acrylate, butadiene or isoprene. Such alkyl acrylates are known. Acrylate rubbers as the graft base can also be products which contain a crosslinked diene rubber of one or more conjugated dienes, such as polybutadiene, or a copolymer of a conjugated diene with an ethylenically unsaturated monomer, such as styrene and/or acrylonitrile, as the core. Examples of other suitable rubbers are EPDM rubbers, that is to say rubbers of ethylene, propylene and a non-conjugated diene monomer.

Preferred rubbers for the preparation of the graft polymers (B) are diene monomer and alkyl acrylate rubbers.

The rubbers are present in the graft polymers (B) in the form of at least partly crosslinked particles with an average particle size of 0.09 to 5 μm, in particular 0.1 to 1 μm. The graft polymers (B) are prepared by free radical grafting copolymerisation of the monomer mixtures defined above, of (B)(1)(1) and (B)(1)(2) in the presence of the rubbers (B)(2) to be grafted, and are all known. Preferred preparation processes for the graft polymers (B) are emulsion, solution, bulk or suspension polymerisation. Particularly preferred graft polymers (B) are the so-called ABS polymers. Halogenostyrenes and p-methylstyrene may be mentioned as nuclear-substituted styrenes.

Preferred copolymers of component (C) are those of at least one monomer from the series comprising styrene, α-methylstyrene, halogenostyrene and methyl methacrylate of (C)(1) with at least one monomer from the series comprising acrylonitrile, methacrylonitrile, methyl methacrylate and maleic anhydride of (C)(2).

Copolymers of component (C) are frequently formed as by-products during grafting polymerisation to prepare component (B), especially if large amounts of monomer are grafted onto small amounts of rubber.

The amount of copolymers (C) to be used according to the invention of 10 to 70 parts by weight, based on 100 parts by weight of (A)+(B)+(C)+(D), does not include these by-products of the grafting polymerisation.

The copolymers of component (C) are resinous, thermoplastic and free from rubber. Particularly preferred copolymers (C) are those of styrene with acrylonitrile and optionally with methyl methacrylate, of α-methylstyrene with acrylonitrile and optionally with methyl methacrylate, or of styrene and α-methylstyrene with acrylonitrile and optionally with methyl methacrylate.

Particularly preferred weight ratios in the thermoplastic copolymer (C) are 60 to 80% by weight of (C)(1) and 40 to 20% by weight of (C)(2).

The copolymers of component (C) are known and can be prepared by free radical polymerisation, in particular by emulsion, suspension, solution or bulk polymerisation. The copolymers of component (C) have molecular weights $\overline{M}w$ (weight-average, determined by light scattering or sedimentation) of between 15,000 and 200,000.

The copolymer components (D) to be employed according to the invention are thermoplastic and preferably contain styrene, α-methylstyrene, nuclear-substituted styrene or mixtures of these vinylaromatics, as the vinylaromatic, methacrylonitrile or acrylonitrile, as the ethylenically unsaturated nitrile compound, and methyl acrylate or methyl methacrylate, as the ester of (meth)acrylic acid.

Such copolymers (D) are known (see, for example, DE-OS (German Published Specification) No. 1,964,915, Japanese Patent Application No. 57-117 505, Japanese Patent Application 52-084 269 and British Patent Specification No. 1,558,835), or they can be obtained by the processes known from these literature references, or can be prepared by the process described in Example 1 of this Application.

The molecular weights of tne copolymers (D) were determined via gel chromatography (in $CH_2Cl_2$ at room temperature) utilising the universal calibration according to Benoit, or via light scattering measurements of solutions of the polymers in dimethylformamide by means of a Fica 50 scattered light instrument from ARL (refractive index increment dn/dc=0.145). The molecular weights of the copolymers (D) according to the invention are weight-average values.

The mixtures according to the invention containing components (A), (B), (C) and (D) and, if appropriate, the customary additives, such as flameproofing agents, stabilisers, pigments, flow control agents, mould release agents and/or antistatics, are prepared by mixing the particular constituents simultaneously or successively at room temperature or at elevated temperature in the known manner and subjecting the mixture to melt compounding or melt extrusion at temperatures of 200° C. to 300° C. in customary units, such as internal kneaders, extruders or twin-screw extruders.

The moulding compositions of the present invention can be used to produce all types of shaped articles, it being possible to utilise the customary production processes, and in particular shaped articles can be produced by injection-moulding. Examples of shaped articles which can be produced are all types of housing components (for example for domestic appliances, such as juice presses, coffee machines and mixers) or covering sheets for the construction sector and components for the vehicle sector. The moulding compositions according to the invention are also employed in the field of electrical engineering, because they have very good electrical properties.

Another type of processing of the moulding compositions according to the invention is the production of shaped articles by deep-drawing from sheets or films previously produced by known processes.

In this Application, particle size always denotes the average particle diameter $d_{50}$, determined by ultracentrifuge measurements in accordance with the method of W. Scholtan et al. Colloids u. Z. Polymere 250 (1972) 782–796.

EXAMPLES

Components employed

Polycarbonate (A) employed:

Linear polycarbonate based on bisphenol A, with a solution viscosity of 1.28, measured in $CH_2Cl_2$ at 25° C. and in a concentration of 0.5 g/100 ml.

Graft polymer (B):

SAN graft polymer of 50% of styrene/acrylonitrile mixture (in a weight ratio of 72:28) on 50% of polybutadiene in particle form, with an average particle size ($d_{50}$) of 0.4 μm, obtained by emulsion polymerisation.

Copolymer (C):

Styrene/acrylonitrile copolymer with a styrene/acrylonitrile ratio of 70:30 and a limiting viscosity of $[\eta]=0.75$ dl/g (measurement in dimethylformamide at 20° C.).

Preparation of a high molecular weight copolymer (D):

360 g of styrene, 140 g of acrylonitrile and 30 g of 1-octadecanol are dispersed together in 4,090 g of water in a reactor, with stirring, the dispersion is warmed to 58° C. and 7.5 g of potassium persulphate (dissolved in 660 g ot water) are added.

After the reaction mixture has been stirred at this temperature for 30 minutes, a mixture of 3,240 g of styrene and 1,260 g of acrylonitrile is metered in over a period of 4 hours, a solution of 25 g of sodium n-dodecylbenzenesulphonate in 1,250 g of water being metered in via a separate feed line. After an after-reaction time, the latex is coagulated with magnesium sulphate/acetic acid and the resulting polymer powder is dried at 70° C. in vacuo. The copolymer thus prepared has a molecular weight ($\overline{M}w$) of $2.5 \times 10^6$.

The heat distortion point was determined by the Vicat (B) method according to DIN 53 460/ISO 360.

The notched impact strength was determined in accordance with the method of DIN 53 452/ISO R 179, on flat bars (90 mm × 10 mm × 4 mm) witn a V-shaped notch with a notch depth of 2.7 mm.

| Examples | | (Comparison) | 1 | 2 | 3 |
|---|---|---|---|---|---|
| Polycarbonate (A) | parts by weight | 45 | 45 | 45 | 45 |
| Graft polymer (B) | " | 33 | 33 | 33 | 33 |
| Copolymer (C) | " | 22 | 21 | 19 | 17 |
| Copolymer (D) | " | — | 1 | 3 | 5 |
| Notched impact strength (room temperature) | $kJ/m^2$ | 31 | 34 | 29 | 30 |
| Heat distortion point (Vicat B) | °C. | 113 | 119 | 116 | 117 |

We claim:

1. Thermoplastic mixtures containing:
   (A) 20–75 parts by weight of a thermoplastic aromatic polycarbonate,
   (B) 10–50 parts by weight of a graft polymer of:
      (B)(1) 5 to 90 parts by weight of a mixture of (B)(1)(1) and (B)(1)(2) wherein (B)(1)(1) is styrene, α-methyl styrene, nuclear-substituted styrene, methyl methacrylate or mixtures thereof and (B)(1)(2) is (meth)acrylonitrile, grafted onto
      (B)(2) 95 to 10 parts by weight of a rubber with a glass transition temperature $TG \leq 10°$ C.
   (C) 10–70 parts by weight of a thermoplastic copolymer with a weight-average molecular weight of 15,000 to 200,000 as measured by light scattering or sedimentation and of 50–95% by weight of (C)(1) copolymerized with 50–5% by weight of (C)(2) wherein (C)(1) is styrene, α-methyl styrene, nuclear-substituted styrene, methyl methacrylate, or mixtures thereof, and (C)(2) is (meth)acrylonitrile, and
   (D) 0.5–5 parts by weight of a copolymer of 95–50% by weight of vinylaromatic compounds and 5–50% by weight of an ethylenically unsaturated nitrile compound, an ester of (meth)acrylic acid or a mixture of both, the copolymer having a weight average molecular weight of $2 \times 10^6$ to $1 \times 10^7$ as determined by gel chromatography or by the light scattering method.

2. Thermoplastic mixtures according to claim 1, characterised in that the copolymer (D) has an $\overline{M}w$ (weight-average molecular weight) of $2 \times 10^6$ to $5 \times 10^6$.

* * * * *